United States Patent
Scherman et al.

(10) Patent No.: US 9,511,422 B2
(45) Date of Patent: *Dec. 6, 2016

(54) DOUBLE-SIDED, INDEXABLE TURNING INSERT

(71) Applicant: SANDVIK INTELLECTUAL PROPERTY AB, Sandviken (SE)

(72) Inventors: Maths Scherman, Österfärnebo (SE); Ronnie Löf, Sandviken (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 367 days.

This patent is subject to a terminal disclaimer.

(21) Appl. No.: 14/219,329

(22) Filed: Mar. 19, 2014

(65) Prior Publication Data
US 2014/0286718 A1    Sep. 25, 2014

(30) Foreign Application Priority Data
Mar. 20, 2013    (SE) ...................................... 1350348

(51) Int. Cl.
*B23B 27/22*    (2006.01)
*B23B 27/14*    (2006.01)

(52) U.S. Cl.
CPC ........ *B23B 27/143* (2013.01); *B23B 2200/081* (2013.01); *B23B 2200/321* (2013.01); *Y10T 407/235* (2015.01)

(58) Field of Classification Search
CPC ............. B23B 27/143; B23B 2200/081; B23B 2200/201; B23B 2200/321
See application file for complete search history.

(56) References Cited

U.S. PATENT DOCUMENTS

| 4,056,872 A | 11/1977 | Seidel |
| 4,334,808 A * | 6/1982 | Seidel .................. B23B 27/143 407/114 |
| 4,359,300 A * | 11/1982 | Hazra .................. B23B 27/143 407/114 |
| 4,411,565 A | 10/1983 | Hazra et al. |

(Continued)

FOREIGN PATENT DOCUMENTS

| JP | 2000254807 | 9/2000 |
| JP | 2004106150 | 4/2004 |
| WO | 2012067114 A1 | 5/2012 |

*Primary Examiner* — Sunil K Singh
*Assistant Examiner* — Alan Snyder
(74) *Attorney, Agent, or Firm* — Corinne R. Gorski

(57) ABSTRACT

A double-sided, indexable, polygonal turning insert includes a plurality of corners, a peripheral clearance surface, and identical upper and under sides. Along the upper side and underside, primary cutting edges, which individually include a nose edge situated in a corner and two main edges, converge toward the same and transform into auxiliary cutting edges, which separate each pair of primary cutting edges along one and the same side. Chip-directing guide surfaces are placed inside the chip surfaces of the cutting edges. The primary cutting edge has a generally positive cutting geometry such that a wedge angle of the cutting edge between the chip surface and the clearance surface is acute in arbitrary sections along the nose edge, as well as along the two main edges. In such a way, the primary cutting edge produces chips that can be guided in a careful, although distinct, way by the guide surfaces.

12 Claims, 12 Drawing Sheets

(56) References Cited

U.S. PATENT DOCUMENTS

| | | | | |
|---|---|---|---|---|
| 5,456,557 A | * | 10/1995 | Bernadic | B23B 27/143 407/114 |
| 5,941,143 A | | 8/1999 | Jawahir et al. | |
| 2009/0226269 A1 | * | 9/2009 | Iyori | B23B 27/143 407/114 |
| 2013/0251468 A1 | | 9/2013 | Lof | |

* cited by examiner

DOUBLE-SIDED, INDEXABLE TURNING INSERT

RELATED APPLICATION DATA

This application claims priority under 35 U.S.C. §119 to SE Patent Application No. 1350348-7, filed on Mar. 20, 2013, which the entirety thereof is incorporated herein by reference.

TECHNICAL FIELD

The present disclosure relates to a double-sided, indexable turning insert having a polygonal basic shape, which includes a plurality of corners, a peripheral clearance surface, and identical upper and under sides, in which there are included flat support surfaces situated in reference planes, which are parallel to each other and to a neutral plane, which is situated halfway between the reference planes and toward which the clearance surface extends at a right angle, a plurality of primary cutting edges, which are formed along the upper side, as well as, the under side and individually include a nose edge situated in a corner and two main edges, which converge toward the same and deviate in relation to a bisector, wherein the nose edge is formed between a front chip part surface and a convex part of the clearance surface and therefore has an arched cutting edge line. The main edges are formed between lateral chip part surfaces and flat parts of the clearance surface and therefore have straight cutting edge lines, at least the main edges having the cutting edge lines thereof situated in a common corner plane, which is inclined in relation to the neutral plane in the direction of the respective reference plane, the main edges transforming into auxiliary cutting edges, which run parallel to the neutral plane and separate pairs of primary cutting edges placed in corners, besides which chip-controlling guide surfaces are situated inside said chip part surfaces.

Referring to FIG. 1, a turning tool 1 is generally illustrated during conventional, external machining of a workpiece 2. The tool 1 includes a holder 3, as well as, a replaceable turning insert 4 made in accordance with the present disclosure. In this case, the workpiece 2 is rotated (in the direction of rotation R) at the same time as the tool is longitudinally fed parallel to the centre axis C1 of the workpiece 2, more precisely in the direction of the arrow F. The longitudinal feed per revolution is designated f, while the cutting depth is designated $a_p$. The entering angle between the direction of the longitudinal feed and a main edge included in the turning insert is designated κ. In the example shown, κ amounts to 95°. It should furthermore be pointed out that the turning insert 4 shown has a rhombic basic shape and has two acute corners having an angle of 80° and two obtuse corners having an angle of 100°. In such a way, a tool back clearance a of 5° between the turning insert and the generated surface of the workpiece is obtained. Usually, the holder 3 is manufactured from steel and the turning insert 4 from cemented carbide or the like.

In all kinds of chip removing machining of metal, including turning, the rule applies that the chip "is born crooked", i.e., immediately after the moment of removal, the chip obtains an inherent aim to be curved. The shape of the chip, among other things its radius of curvature, is determined by several factors, the most important of which in connection with turning are the feeding of the tool, the rake angle of the cutting edge, the cutting depth in question, as well as the material of the workpiece. After the removal, the chip will move perpendicular to each infinitesimal part of the cutting edge. If the cutting edge is straight, the chip therefore becomes flat or cross-sectionally rectangular, but if the same is entirely or partly arched, also the chip becomes cross-sectionally entirely or partly arched.

Another factor of vital importance to the turning process is the choice of the so-called cutting geometry of the cutting edges. Two categories of cutting edges are distinguished by those skilled in the art, on one hand, cutting edges having a positive cutting geometry, and, on the other hand, cutting edges having a negative cutting geometry. In the first-mentioned case, a wedge angle of the cutting edge between the chip surface and the clearance surface, which together form the cutting edge, is smaller than 90°, i.e., acute, while the wedge angle of the cutting edge in the second case amounts to 90° (or more). A difference between a cutting edge having a positive cutting geometry and one having a negative is that the first-mentioned one can lift out the chip by being wedged in between the same and the generated surface, while the last-mentioned one pushes the chip in front of itself while shearing off the same. Therefore, positive cutting edges generally are more easy-cutting than negative ones, and produce chips having greater radii of curvature than chips from the last-mentioned ones.

In order to provide an additional background understanding of the nature of the chip produced in connection with turning, attention is directed to a metaphor, which is used by those skilled in the art to explain that chips having different width/thickness have different bendability. Thus, a thin and narrow chip may be compared to a slender blade of grass, while a thick chip may be compared to a stiff reed. Similar to the blade of grass, a thin chip can without appreciable difficulty be bent if the same is brought toward an obstacle in the form of an adjacent and more or less steeply sloping guide surface, while a stiff, reed-like chip would be over broken under the same conditions; this is something that causes a high sound level, great cutting forces, a short service life of the turning insert, as well as a high generation of heat, possibly accompanied by sticking.

In connection with turning, chip control and chip evacuation are of large importance, not only to the machining result, but also to an efficient, problem-free operation. If the removed chip would not be guided by any guide surface or chip breaker, the same will be developed in an uncontrolled and unforeseeable way. Thus, thin and bendable chips (cf. blades of grass) may curl in long, telephone cord-like screw formations having a considerable diameter, which may impinge on and damage the generated surface of the workpiece, and—not the least—get entangled in the tool or other components included in the machine in which machining takes place. If a thicker and stiffer chip, on the other hand, shortly after the removal would impinge on a steeply sloping guide surface, other problems will arise, such as tendency to over breaking of the chip, extreme generation of heat, which may entail sticking, and that the turning insert becomes blunt-cutting, as well as risk of premature wearing damage in the chip-guiding surfaces. Therefore, an optimum, desirable chip control is obtained if the guide surfaces are situated at such a distance from the cutting edge line of the cutting edge and have such an angle of inclination that the chip is carefully guided away, in such a way that the same can be broken into smaller fragments, e.g. by being curled and cracked, or is brought to impinge on the clearance surface of the turning insert and be broken into pieces against the same. Even if helicoidal chips—rather than short fragments—peradventure would be formed, it is desirable that the same have a small diameter and a limited length.

In this connection, it should be pointed out that a good chip control and chip evacuation is particularly important in modern, software-controlled turning machines, which are placed in sealable housings and periodically unmanned. If the chips would not be divided into smaller fragments (or short screw formations), which can be carried away via a conveyor included in the machine, but rather form unmanageable chip tangles, the last-mentioned ones may quickly cause shutdown and serious damage to the machine, when this is unmanned.

A double-sided turning insert of initially generally mentioned kind is previously known by U.S. Pat. No. 4,411,565. A general merit of said known turning insert is that the two straight main edges of the primary cutting edge are located in a common corner plane, which is inclined at an angle in relation to the neutral plane of the turning insert. In such a way, the active, straight main edge can in a desirable way be oriented horizontally in relation to the rotary workpiece at the same time as the clearance part surfaces—flat and arched, respectively—connecting to the main edge and the nose edge, respectively in the current corner, obtain a good clearance from the workpiece. However, a disadvantage of the known turning insert is that the nose edge, as well as the two main edges, which together form a primary cutting edge, have a negative cutting geometry because the same are formed between chip surfaces and clearance surfaces, which form an angle of 90° with each other, i.e., the wedge angle of the cutting edge along the primary cutting edge in its entirety amounts to 90°. It is true that this means that the primary cutting edge becomes strong, but, on the other hand, considerably more blunt-cutting than a cutting edge having a positive cutting geometry. This negative cutting geometry is particularly disadvantageous in connection with finishing or medium turning with small or medium-sized cutting depths, among other things as a consequence of the fact that cutting edge may dig into the machined material and discontinue an initiated pass along the workpiece. Furthermore, the lands or chip-formers, in which the chip-directing guide surfaces are included, are wedge-shaped (as viewed in plane elevation), the chip surfaces and the guide surfaces being separated via cross-sectionally V-shaped chutes, above which the chips have to pass without any subjacent support before reaching up to the guide surfaces. What is more, the individual guide surface rises at a fairly steep angle (45°), which is something that entails that such thick and stiff chips (cf. reed) that are produced when the cutting depth and the feed are large will impinge on the guide surface with a great force under considerable generation of heat. Also the fact that the guide surface situated farthest from the nose edge is situated near the cutting edge line of the cutting edge significantly contributes thereto; this implies that a wide, thick chip, when it impinges on the guide surfaces, has not had time to cool down appreciably after the moment of removal, (in which the chip is red-hot and plastic).

SUMMARY

The present disclosure aims at obviating the above-mentioned shortcomings of the turning insert known by U.S. Pat. No. 4,411,565 and at providing an improved, double-sided turning insert. Therefore, a basic object of the is to provide an easy-cutting, double-sided turning insert having a good chip control and having a good clearance from the workpiece. A further object is to provide a turning insert in which easy-cutting properties at small or medium-sized cutting depths are combined with strength, when such is particularly called for, viz. when the cutting depth is large and the chip is wide and stiff. The good chip control should be obtained by a careful, although distinct guiding of the chip irrespective of whether the same is produced at small, medium-sized, or large cutting depths. In other words, thin and easily bendable chips (blades of grass) should, quickly after the moment of removal, obtain a considerable and reliable guiding, while wide and stiff chips (reed) should be allowed to develop a great radius of curvature before they reach the chip-directing guide surface; all with the purpose of avoiding over breaking and harmful generation of heat.

According to the disclosure, at least the basic object is attained by the individual primary cutting edge having a generally positive cutting geometry so far that not only a wedge angle of the cutting edge between the chip and clearance part surfaces of the individual main edge, but also the wedge angle of the cutting edge between the chip and clearance part surfaces of the nose edge is acute in arbitrary sections with the respective cutting edge lines. In such a way, the primary cutting edge becomes easy-cutting along its entire cutting edge line, which is something that ensures an efficient chip removal independently of the cutting depth in question.

In a preferred embodiment, not only the cutting edge lines of the main edges, but also the cutting edge line of the nose edge, are collectively situated in the corner plane inclined to the neutral plane. This means that the turning insert can be tipped into an optimum space position, in which the nose edge as well as the individual main edge can operate efficiently. In this way, the corner plane with the entire primary cutting edge can be essentially horizontally oriented in relation to the workpiece when the double-sided turning insert has been tipped into said space position in order to provide clearance between the workpiece and the clearance surface. In other words, a more favourable rake angle can be obtained along the entire primary cutting edge to further reduce cutting forces, sound, and generation of heat.

In a further embodiment, the wedge angle of the cutting edge of the primary cutting edge can increase from a smallest value in a section along the bisector between the main edges toward a greatest value closer to the individual auxiliary cutting edge. In this way, the cutting edge obtains an optimum, positive cutting geometry where the stresses on the turning insert are minimal, i.e., along the nose edge, while the strength of the primary cutting edge increases where it is more called for, i.e., along the main edges.

In yet an embodiment, the main edge transforms into the auxiliary cutting edge via an arched transition edge, wherein the wedge angle of the cutting edge of the transition edge successively increases in the direction from the individual main edge toward the auxiliary cutting edge. In such a way, the wedge angle of the cutting edge can, from being acute along the main edge, can be increased to 90° along the auxiliary cutting edge with the purpose of giving the last-mentioned one optimum strength, at the same time as the transition becomes even and thereby gentle to the chip. The arched (smooth) transition edge may in addition entail an increased service life and improved cutting properties by the (smooth) wave portion that is formed in the cutting edge line by the arched transition edge between the main edge and the auxiliary cutting edge.

In a further embodiment, the chip-guiding surfaces may have a height (=level difference between the support surfaces of the turning insert and a plane common to the auxiliary cutting edges) that amounts to at most 0.400 mm. Most suitably, the height amounts to maximally 0.300 mm. This maximization of the height of the chip-guiding flank surfaces contributes considerably to a careful guiding of the chips, above all by allowing stiff chips to develop an advantageously great radius of curvature.

In yet an embodiment, the chip-directing or chip-breaking guide surfaces are inclined at a pitch angle, which amounts to at most 30° in relation to the neutral plane. In such a way, a careful, although distinct, guiding of the chip is guaranteed irrespective of whether the same is easily bendable or stiffer.

In one embodiment, the guide surfaces for the chip are, on one hand, a breast surface included in a knob, which is situated behind the nose edge along the bisector between the main edges, and, on the other hand, a pair of flank surfaces included in a land situated behind the knob and in which also the support surface is included, the breast surface being convexly arched and having a length extension that runs transversely to the bisector, and the breast surface sloping at an angle, which decreases from a greatest value along the bisector toward a smallest value in a section perpendicular to the bisector. In other words, the length extension of the breast surface is transverse in relation to the bisector at the same time as the surface becomes flatter and flatter toward the two end points. In such a way, the breast surface of the knob guarantees a quick, distinct guiding of thin chips, at the same time as the end portions of the knob do not form any abruptly rising obstacles to the wider and stiffer chips.

In a further embodiment, at a distance behind the knob, there is formed a second breast surface, the upper part of which is situated on a higher level than the upper part of the first breast surface. In such a way, it is guaranteed, by means of the rear and higher breast surface, that the thin chip obtains guiding even if the same would pass or "jump over" the first breast surface without being guided by the same.

In another embodiment, the corner plane has an angle of inclination in relation to the neutral plane that is 6°-11°, for instance an angle of inclination of 8.5°. In such a way, a satisfactory clearance is guaranteed between the workpiece and the turning insert in the tipped-in spatial position. If the inclination exceeds this, in particular if the extension of the corner plane is relatively large, there is a risk of over breaking of chips at cutting depths that exceed the extension of the corner plane. As pointed out previously, the support surfaces of the double-sided turning insert should not be placed on too high a level above the auxiliary cutting edge.

In a further embodiment, the primary cutting edge and the corner plane have an extension that maximally amounts to a cutting depth of 2-5 times the radius of the nose edge, for instance a maximum extension that amounts to a cutting depth of approx. 3.75 times the radius of the nose edge. In this way, said risk of over breaking of chips can nevertheless be reduced, since said support surfaces thereby do not need to be placed on too high a level above the auxiliary cutting edge.

In another embodiment, the turning insert has a distance, in the direction perpendicular from the cutting edge line up to the chip-controlling guide surface, which increases with the cutting depth when this exceeds the extension of the primary cutting edge and corner plane. Also, in this way, the risk of over breaking can be reduced, since the distance increases for wider chips so that the same are allowed to develop a great radius of curvature before they reach the chip-directing guide surface.

In U.S. Pat. No. 4,056,872, a polygonal, double-sided turning insert is disclosed, the individual primary cutting edge of which includes two straight main edges, diverging from a common nose edge, which are inclined in relation to the neutral plane of the turning insert. In this case, however, every auxiliary cutting edge is lacking between the pairs of corners along the same side of the turning insert. Thus, the main edges extend in their entirety from the appurtenant nose edges to a central point, in which they directly transform into each other. This means that the chip-guiding flank surfaces of a central land become high and are rising at a very steep angle immediately inside the cutting edge line. Therefore, every wide and stiff chip will quickly dive into the flank surface with a great force and with an obvious risk of over breaking and extreme generation of heat.

The foregoing summary, as well as the following detailed description of the embodiments, will be better understood when read in conjunction with the appended drawings. It should be understood that the embodiments depicted are not limited to the precise arrangements and instrumentalities shown.

DETAILED DESCRIPTION

Figure 2:
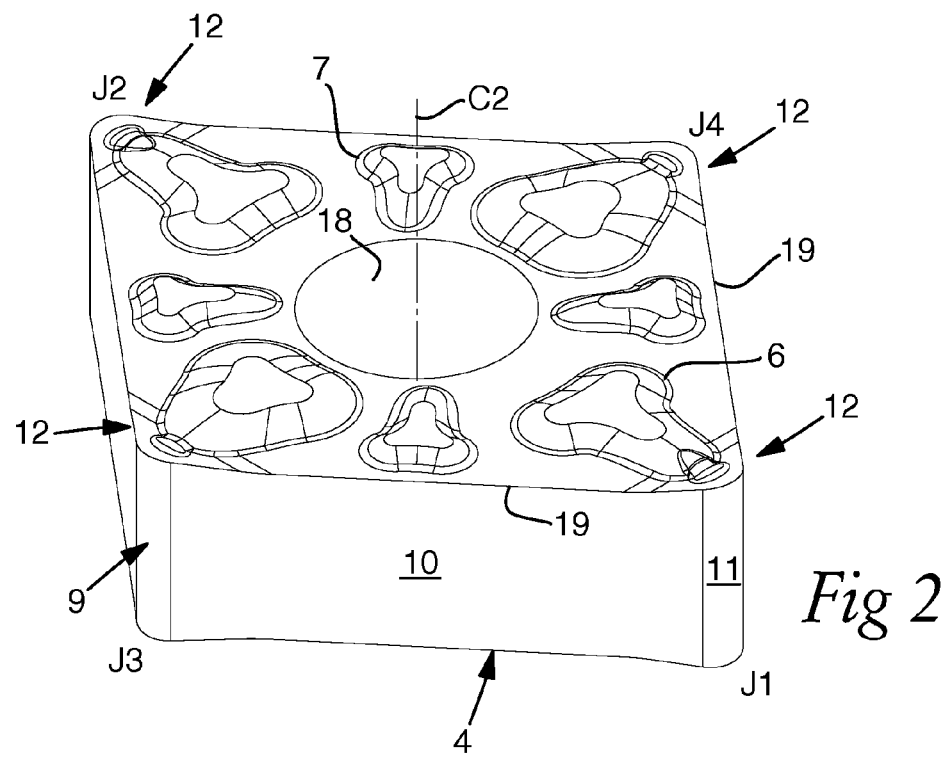
FIG. 2 is a perspective view of a turning insert according to the disclosure.
Figure 3:
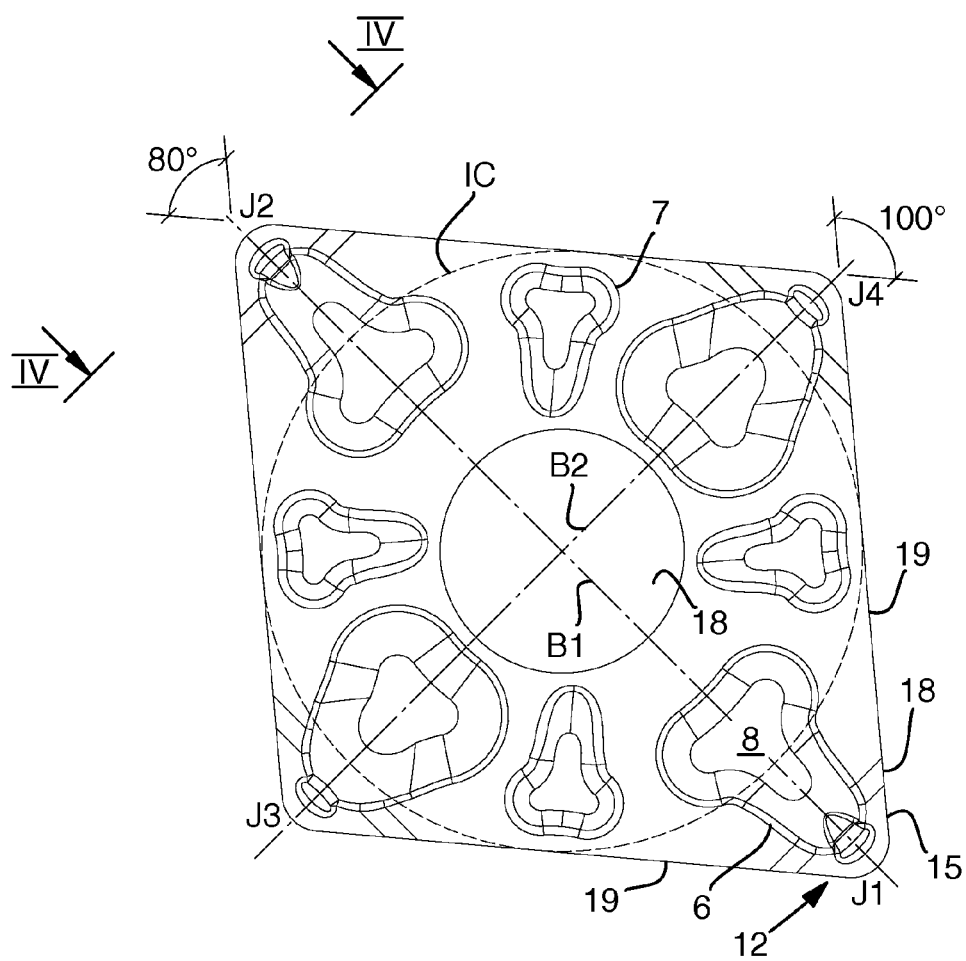
FIG. 3 is a planar view from above of the turning insert according to FIG. 2.
Figure 4:
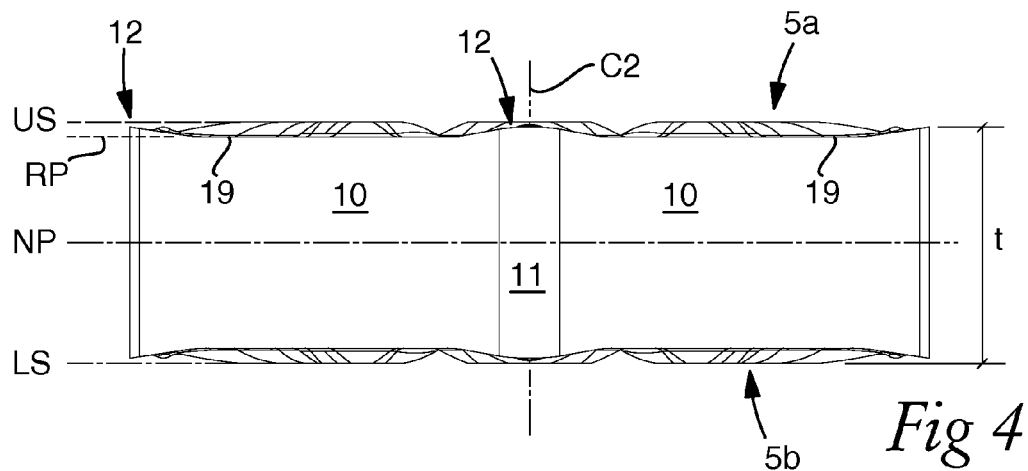
FIG. 4 is an enlarged side view of the turning insert.

Referring to FIGS. 2-4, the turning insert 4 has a polygonal basic shape and includes a pair of opposite upper and under sides generally designated 5a and 5b, respectively. The turning insert is double-sided so far that the upper and under sides are identical. For this reason, only the upper side 5a will henceforth be described in detail.

In the upper side 5a, there are included a plurality of mutually separated lands 6,7, which individually include a flat surface 8, which serves as a support surface when the turning insert is turned upside down and is applied into a seat in the tool holder 3. Of the total eight lands, four ones,—the lands 6, are located in the area of corners of the turning insert, while the lands 7 are placed approximately halfway between two corner lands 6. All support surfaces 8 along the upper side and under side, respectively, of the turning insert are located in a common plane US and LS, respectively, to simultaneously be able to abut against a flat bottom surface in the appurtenant seat. A neutral plane NP is situated halfway between the planes US and LS and parallel to the same. The geometrical features described henceforth, and which determine the shape of the turning insert, will be related to this neutral plane NP.

In the example, the turning insert is rhombic and includes four corners J1, J2, J3, and J4 (see FIG. 2), which are pair-wise opposite each other. At the corners J1, J2, the turning insert is acute, while the corners J3, J4 are obtuse. Although the corner angles may vary, in this case, the acute angles are 80° and the obtuse angles 100°. Between the upper and under sides 5a, 5b, a circumferential clearance surface extends, which is generally designated 9, and which includes a plurality of part surfaces, four flat surfaces 10 and four convex surfaces 11, which are situated in the corners and form round transitions between adjacent, flat surfaces 10. In FIG. 3, B1 designates a bisector of the acute-angled corners J1, J2, while B2 designates a bisector of the obtuse-angled corners J3, J4. An inscribed circle of the type that traditionally is used to size classify turning inserts is designated IC. In practice, the IC measure of turning inserts of the kind in question may be within the range of 6-25 mm. The thickness t of the turning insert (see FIG. 4), such as this is defined as the axial distance (the level difference) between the lower plane LS and a cutting tip (which will be described later) along the upper side 5a, is considerably smaller than the IC measure. In a prototype embodiment, which forms the basis of the drawing figures, the IC measures 12.7 mm and the thickness t is 4.76 mm.

Along the individual upper and under side, respectively, there are formed two pairs of diametrically opposed cutting edges 12, which are situated along the bisector B1 between the acute corners J1, J2, as well as along the bisector B2 between the obtuse corners J3, J4. Of these cutting edges 12, the ones situated in the corners J1, J2 are of the greatest interest in the context of the disclosure. Although all four cutting edges, per se, are usable, only one pair can be used in one and the same tool holder 3. For this reason, only the cutting edges at the acute corners J1, J2 will be described in detail. As a matter of form, it should be pointed out that the present cutting edges 12 henceforth will be denominated "primary cutting edges".

Figure 5:
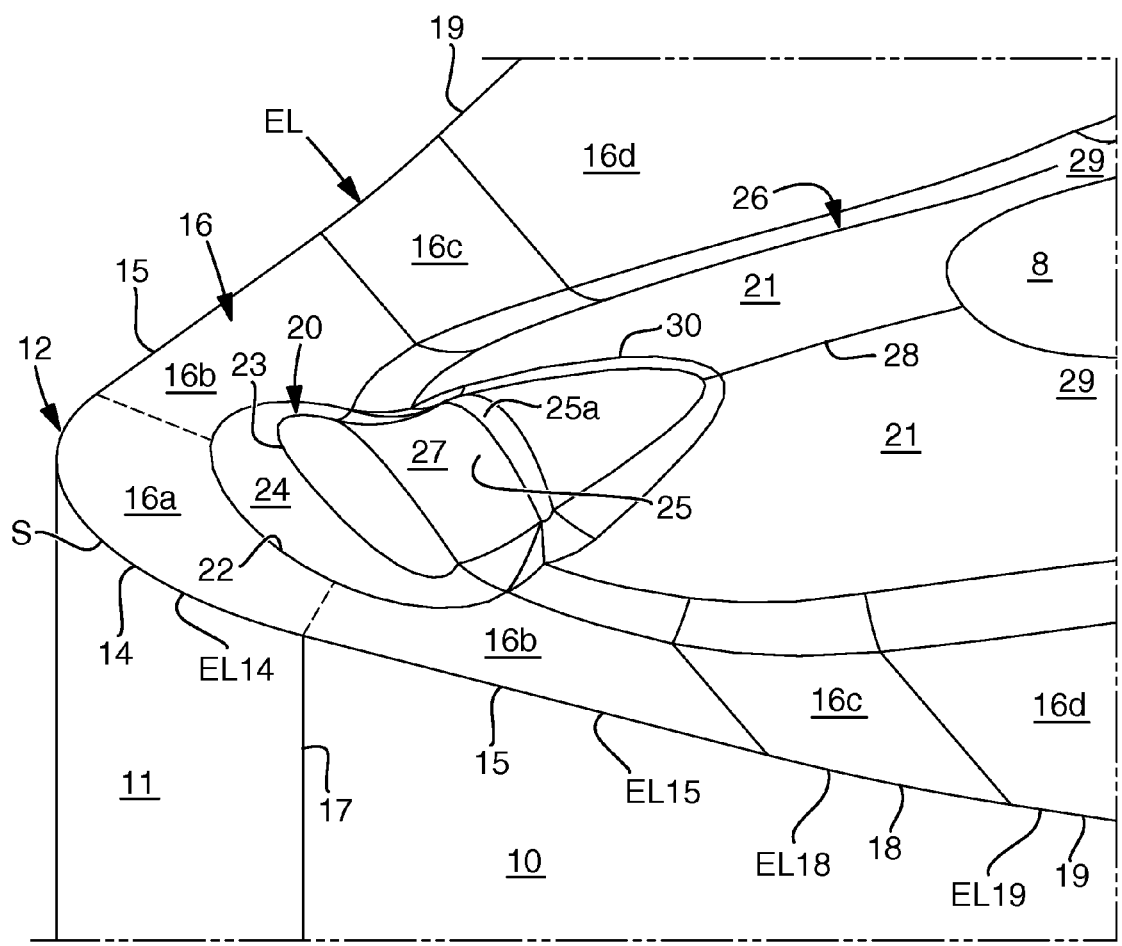
FIG. 5 is a further enlarged top view showing the design of the turning insert adjacent to a corner.
Figure 6:
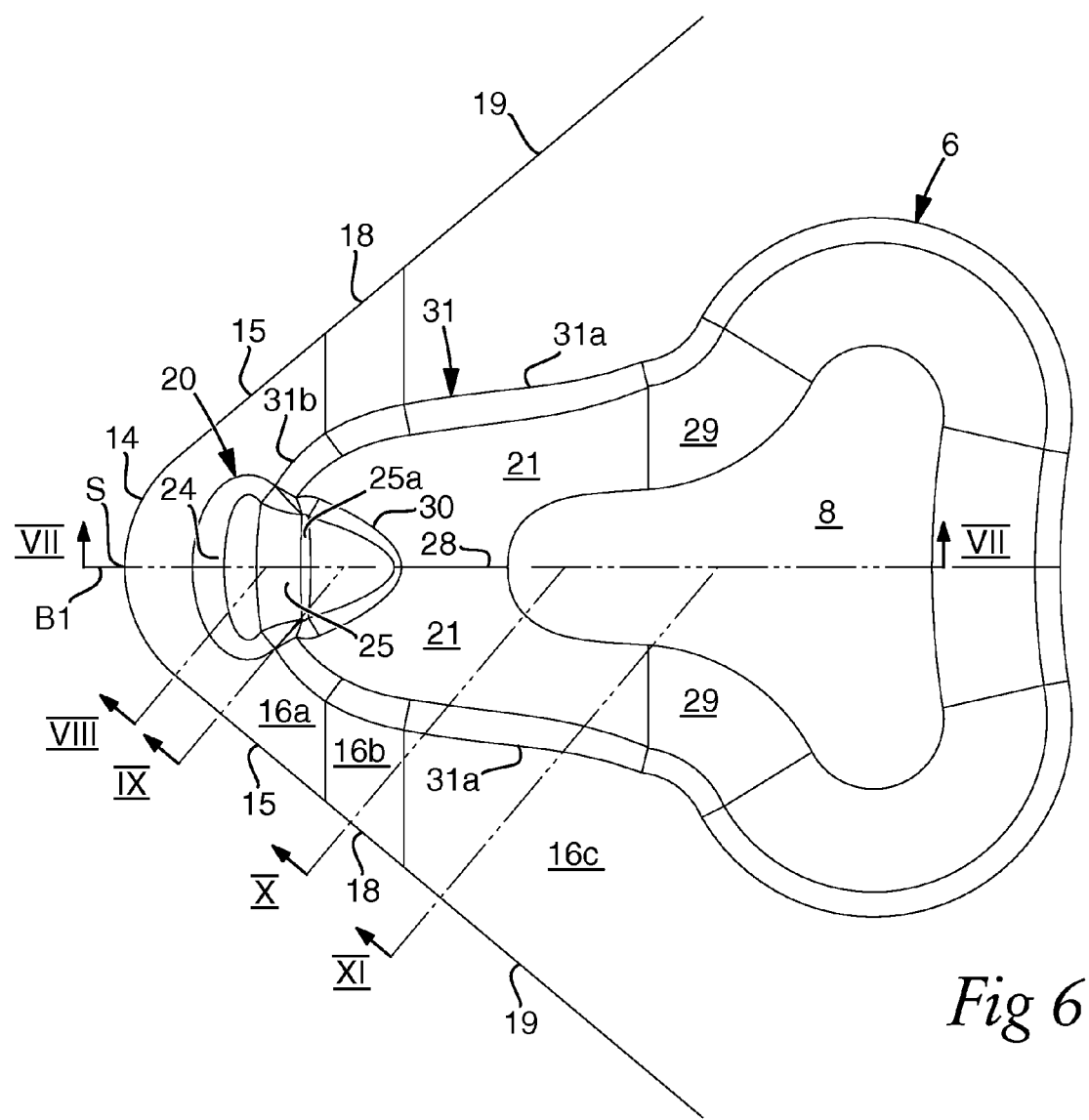
FIG. 6 is a planar view from above of the same corner as in FIG. 5.
Figure 7:
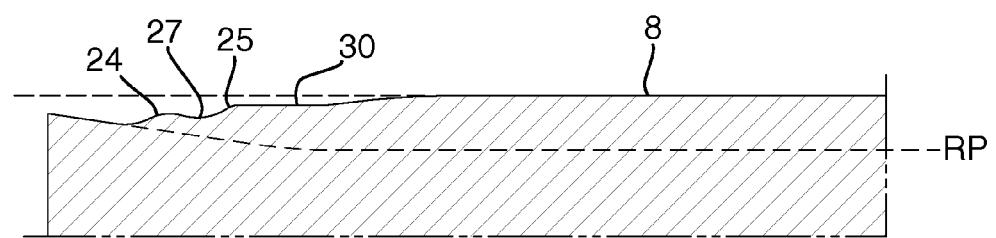
FIG. 7 is a cross-section taken along line VII-VII of FIG. 6.
Figure 8:
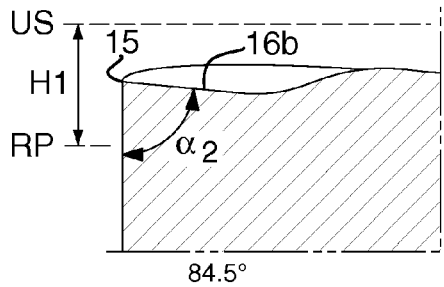
FIGS. 8-11 are cross-sections showing the wedge angle of the cutting edge in different segments taken along lines VIII-VIII; IX-IX; X-X; XI-XI along the periphery of the turning insert.
Figure 9:
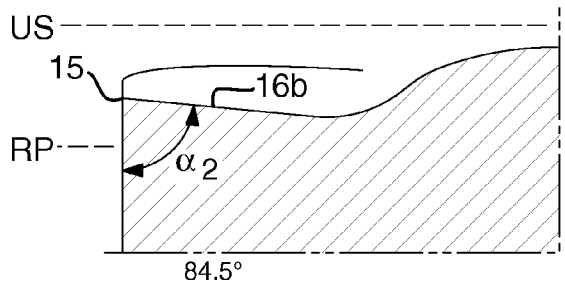
Figure 10:
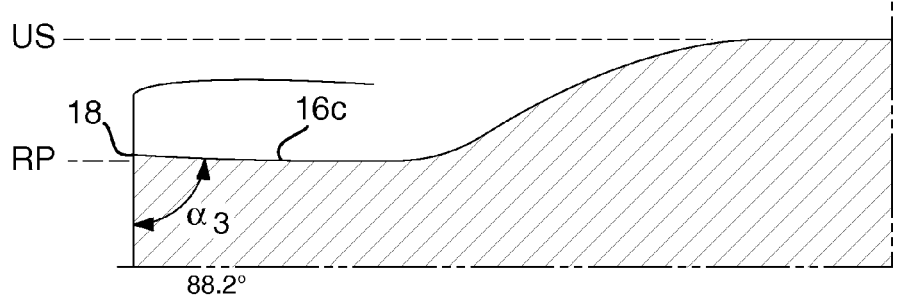
Figure 11:
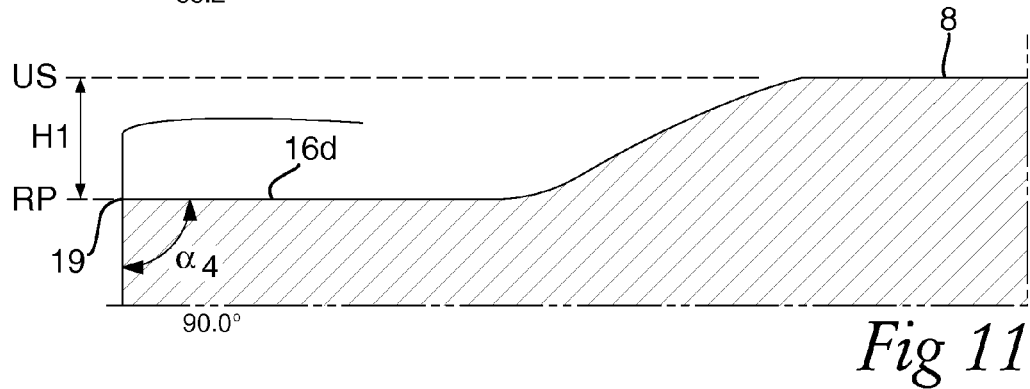

As seen in FIGS. 5 and 6, the individual primary cutting edge 12 includes three part edges, a nose edge 14 situated in a corner as well as two main edges 15, which converge toward the same and are individually formed between a chip surface in its entirety designated 16 and the part surfaces 10, 11 of the clearance surface 9. Of these part surfaces, the surfaces 10 are flat, and therefore the individual main edge 15 becomes straight as viewed in plane elevation, while the part surface 11 is convexly arched, e.g., partially cylindrical, whereby the nose edge 14 becomes arched, e.g., partially circular, as viewed in plane elevation. The convex clearance surface 11 of the nose edge 14 transforms into the flat clearance part surfaces 10 via vertical boundary lines 17. In FIG. 5, EL generally designates a circumferential cutting edge line between the clearance surface and the upper side (or chip face) of the turning insert. Although also the reference designations 14 and 15 point to the cutting edge line designated EL, it should be pointed out that the cutting edges as such consist of the material portions that are delimited between a chip surface and clearance part surface, the last-mentioned ones meeting each other along the cutting edge line.

The chip surface in its entirety designated 16 includes a plurality of part surfaces, a first chip part surface 16a behind the nose edge 14, two chip part surfaces 16b adjacent to the main edges 15, two chip part surfaces 16c adjacent to the transition edges 18, and two chip part surfaces 16d adjacent to the auxiliary cutting edges 19. Furthermore, the arched part of the cutting edge line EL (between the chip part surface 16a and the clearance part surface 11) is designated EL14, while the straight parts of the cutting edge line (between the chip part surfaces 16b and the clearance part surfaces 10) are designated EL15.

At medium-sized cutting depths (1-2 mm), the principal chip removal is effected by the individual main edge 15, while the nose edge 14 has the purpose of, on one hand, operating alone at small cutting depths (0.5-0.8 mm), and, on the other hand, wiping off the generated surface of the workpiece regardless of which one of the two main edges 15 is active (at greater cutting depths).

In FIGS. 2 and 3, it is furthermore seen that the turning insert includes a central, through hole 18, the center axis of which is designated C2. This hole is intended for the receipt of a screw for the fixation of the turning insert in the seat of the tool holder. The center axis C2 also forms a geometrical center of the turning insert in its entirety. It is axiomatic that the two corners J1 and J2 are equidistantly separated from the center axis C2. Also the radial distances from the center axis C2 to the two corners J3, J4 are equally large, although smaller than the distances to the corners J1, J2. In this connection, the turning insert also may be fixed by means of other means than screws, e.g., clamps, levers, or the like. In such cases, the turning insert may be manufactured without holes.

The two main edges 15, which together with the nose edge 14, form the individual primary cutting edge 12, are situated in a common plane CP (henceforth denominated "corner plane"), which is inclined in relation to the neutral plane NP. Thus, the individual, straight main edge 15 transforms into a likewise straight auxiliary cutting edge 19 via a slightly arched transition edge or intermediate edge 18. When the cutting edges 15, 18, 19 are regarded in plane elevation (e.g., according to FIG. 3 or 6), their cutting edge lines follow a common, straight line, because the same border on the flat clearance part surface 10. As viewed from the side, however, the intermediate edge 18 is slightly arched as a consequence of a chip part surface 16c being inside being slightly arched, while the cutting edge lines EL15 and EL19 of the main edge 15 as well as of the auxiliary cutting edge 19 are straight as viewed from the side, more precisely as a consequence of the chip part surfaces designated 16b and 16d being flat. In this connection, it should be pointed out that the different chip part surfaces 16a, 16b, 16c, and 16d are shown separated by means of construction lines. However, these have only the purpose of providing understanding of the existence of the part surfaces. In practice, the part surfaces in question are included in a single continuous, smooth chip surface, in which they cannot be perceived by the naked eye. Moreover, the inclined corner plane CP is defined by the cutting edge part lines EL14 and EL15 rather than by any part of the individual chip part surface 16a and 16b situated inside the same.

The auxiliary cutting edges 19 (see FIGS. 4 and 5) run parallel to the neutral plane NP and are situated in a common reference plane RP, which is countersunk in relation to the plane US (or LS) of the support surfaces 8. A key feature is that the primary cutting edge 12 has a generally positive cutting geometry, more precisely so far that the two main edges 15, which together with the nose edge, as seen from the enlarged sections in FIGS. 8-12. Thus, in the prototype embodiment, the wedge angle of the cutting edge $\alpha_1$ in the section VII-VII (see FIGS. 6 and 12) amounts to 81.5°, i.e., an angle the complementary angle of which amounts to 8.5°. From the section VII-VII, the wedge angle of the cutting edge of the nose edge 14 increases successively from 81.5° to 84.5° up to the end that is defined by the boundary line 17. In the sections VII-VIII and IX-IX, i.e., along the main edge 15, the wedge angle of the cutting edge $\alpha_2$ is constant and amounts to 84.5° (complementary angle=5.5°). After that, the angle $\alpha_3$ increases again successively along the intermediate edge 18 to finally reach 90°, which is a constant wedge angle of the cutting edge $\alpha_4$ along the entire auxiliary cutting edge 19. Hence, the cutting geometry of the last-mentioned one will be negative, but this is however an advantage so far in that the part of the chip that is removed along the auxiliary cutting edge is always wide and stiff, involving that the chip in this area subjects the turning insert to large stresses. For this reason, it is favorable that the wedge angle of the cutting edge $\alpha_4$ is right angled along just the auxiliary cutting edge 19, because this will then be particularly strong.

For each primary cutting edge 12, there are chip-controlling means in the form of guide surfaces included in a knob 20 as well as in the land 6 being behind. Also the shape of the knob 20 is made clear by means of imaginary construction lines, i.e., a lower boundary line 22 and an upper line 23 (see FIGS. 5 and 13). Of these, the lower line 22 marks where the knob begins to rise in relation to the surrounding chip part surfaces 16a, 16b, while the upper line 23 distinguishes a lower part of the knob from an upper one.

Figure 13:
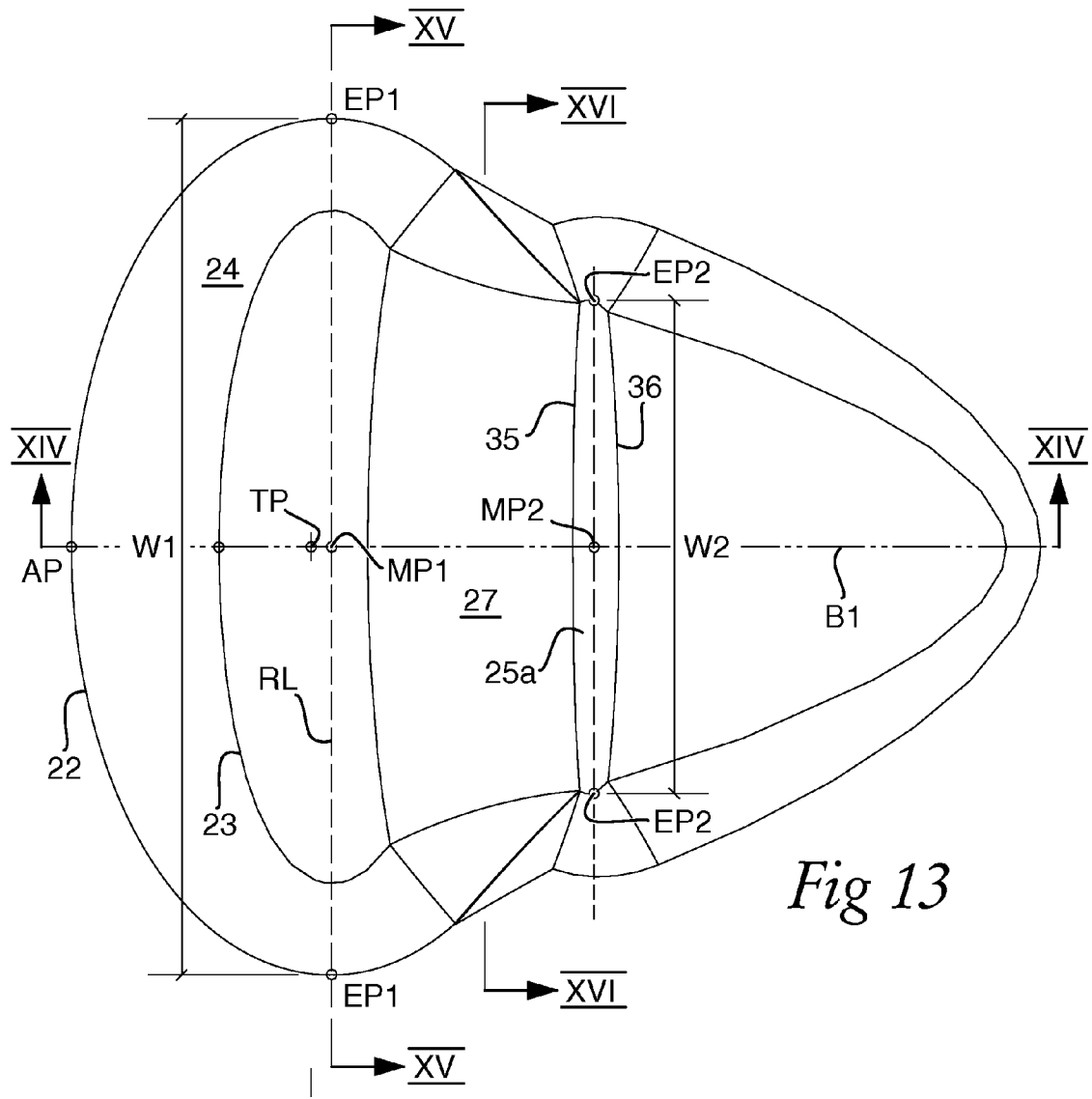
FIG. 13 is an enlarged detailed view showing the geometrical shape of a first breast surface included in a chip-guiding knob and a second breast surface.
Figure 14:
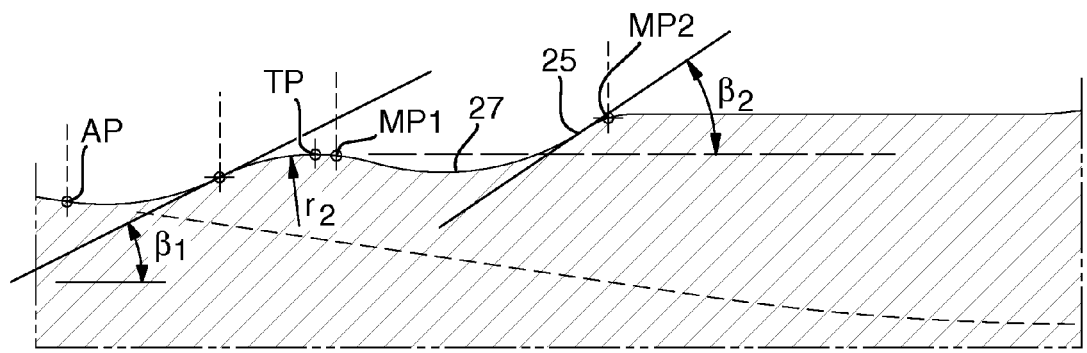
FIG. 14 is a longitudinal cross-section taken along line XIV-XIV of FIG. 13.

From the enlarged geometry illustrations in FIGS. 13 and 14, it is seen that a forward/downwardly sloping breast surface 24 is included in a transition between the upper and lower parts of the knob. Breast surface 24 is generally elongate and has a convexly arched shape. The elongate extension is transverse in relation to the bisector B1, more precisely so far that the arched, lower boundary line 22 has an apex point AP situated along the bisector B1 and includes two mirror-symmetrical arc part lines, which extend from the apex point AP to a pair of opposite end points EP1 situated along a straight reference line RL, which intersects the bisector at a right angle in a middle point MP1 between the end points EP1. The distance between the end points EP1, which determines the width of the breast surface (and of the knob), is greater than the distance between the points MP1 and AP.

In the shown, preferred embodiment, the breast surface 24 has even such a great width that also the distance between the centre MP1 and the individual end point EP1 is somewhat greater than the distance between MP1 and AP. Another feature of the breast surface 24 is that the angle of inclination $\beta_1$ thereof, in arbitrary vertical sections through the centre MP1, decreases from a greatest value in a section along the bisector B1 to a smallest value in a section through the individual end point EP1. In other words, the inclination becomes flatter and flatter in the direction from AP toward EP1. By this shape of the knob and the breast surface thereof, it is gained that a relatively wide and stiff chip, which primarily is removed along the main edge 15, and possibly its extension in the cutting edges 18 and 19, will be subjected to a cautious guiding when the same successively slides up along the side of the knob. In order to counteract over breaking of such chips, the upper part or crown of the knob 20 has in addition a moderate height above the surrounding chip surface. The two-dimensional arched shape of the knob 20 may also be described as the radius of curvature $r_1$ laterally of the knob (see FIG. 15) being greater than the radius $r_2$ along the bisector (see FIG. 14).

During the development work, it has been found that the knob 20 and the breast surface 24 thereof not always have given the desired chip guiding ability for such narrow chips that are produced when the cutting depth is small and the feed relatively large, i.e., narrow and thick chips. Thus, such chips have tended to pass ("jump over") the breast surface without the same having been able to guide the same in the desired direction. In order to obviate this risk, the turning insert according to the disclosure may also be formed with a second breast surface 25 (see FIGS. 5 and 6), which is situated at a certain distance behind the first breast surface 24, and has its upper part situated on a higher level than the upper part of the first breast surface. In the shown, preferred embodiment, the knob 20 and the land 6 are integrated via a ridge, which in its entirety is designated 26 and rises from a lowest end in a valley 27 (see also FIG. 12) situated on a level below the crown of the knob 20, to a highest end on a level with the upper support surface 8 of the land 6. The ridge 26 is primarily delimited by the aforementioned flank surfaces 21, which extend downward from a common (imaginary) crest line 28 as well as in the forward extension of the flank surfaces 29 (see FIG. 6) that delimit the land 6 in other respects. The second breast surface 25 is included in a cam 30, which is formed on the ridge 26 (see FIGS. 5 and 6) and tapers in the backward direction toward the crest line 28. It should also be noted that the rear part of the land 6 has a bicycle saddle-like contour shape. The rear, wide segment of the support surface 8 will therefore give a good support laterally.

Figure 12:
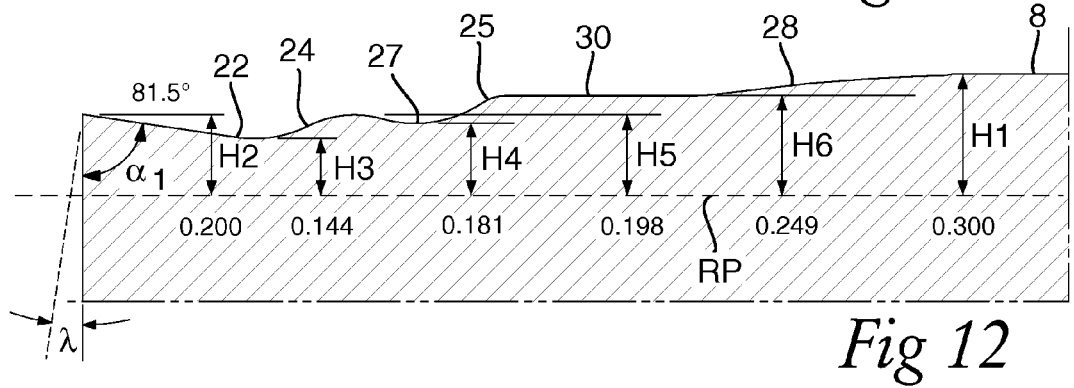
FIG. 12 is a cross-section corresponding to FIG. 7, although enlarged, showing level differences between different portions included in the upper side of the turning insert.

FIG. 12 illustrates the level differences between the surface portions that determine the topography of the upper side of the turning insert adjacent to the individual corners J1, J2. In the previously mentioned prototype embodiment (IC=12.7 mm and t=4.76 mm), the level difference H1 between the support surface 8 of the land 6 and the reference plane RP amounts to 0.300 mm, and the level difference H2 between the cutting tip S of the nose edge 14 and RP to 0.200 mm. The corresponding level differences between RP and, in turn, the boundary line 22 (situated in a hollow between the breast surface 24 and the chip part surface 16a), the lowest point of the ridge 26 (situated in the valley 27 between the back side of the knob 20 and the second breast surface 25), the crown of the knob 20, and the crest of the cam 30, are designated H3, H4, H5, and H6, respectively. In the prototype embodiment, H3 amounts to 0.144 mm, H4 to 0.181 mm, H5 to 0.198 mm, and H6 to 0.249 mm. Hence it follows that the second, rear breast surface 25 projects 0.051 mm (0.249-0.198) higher than the first, front breast surface 24. Narrow chips, which pass the front breast surface 24 without being subjected to distinct guiding, will therefore with greater certainty impinge on the projecting second breast surface 25 and be guided sideward by the same.

Like the first breast surface 24, the second breast surface 25 has a generally elongate and convexly arched shape, as well as is transverse in relation to the bisector B1. The shape and situation of the second breast surface 25 are seen in more detail in FIGS. 13-17. As may be best seen in FIGS. 13 and 14, the breast surface 25 extends downward/forward from a long narrow transition surface 25a (so-called radius transition), which is delimited between two boundary lines 35, 36. The transition surface extends between two end points EP2, between which there is a centre MP2, which, like MP1, is located along the bisector B1. The distance between the end points EP2 defines the width of the second breast surface, which is designated W2. The general angle of inclination β2 of the second breast surface 25 is, in the example, somewhat greater than the angle of inclination $\beta_1$ of the first breast surface 24. In the example, $\beta_2$ amounts accordingly to 34° and $\beta_1$ to 27°.

With continued reference to FIGS. 13 and 14, it should—as a matter of form—be pointed out that the highest point TP of the crown of the knob 20 is situated somewhat in front of the cross section XV-XV that runs between the two end points EP1 that determine the width W1 of the breast surface 24.

Figure 15:
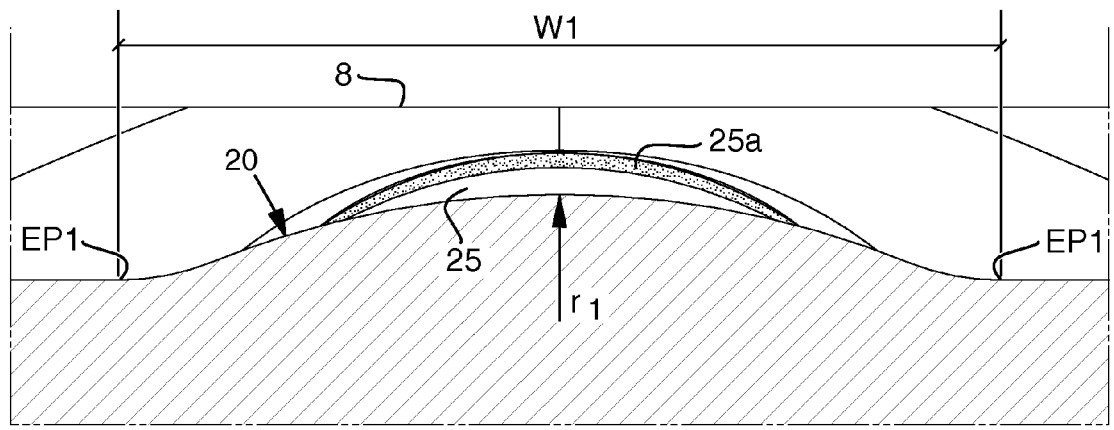
FIG. 15 is an enlarged cross-section taken along line XV-XV of FIG. 13.

In FIG. 15, it is shown how the crown of the knob 20 has a successively flatter shape from the middle of the crown toward the end points EP1. In the intermediate area, the crown has (and thereby the first breast surface 24) accordingly a comparatively great radius of curvature, which is designated $r_1$. As clearly seen in FIG. 15, the second breast surface being behind and the transition surface 25a thereof project in relation to the first breast surface (0.051 mm according to the preceding example).

Figure 16:
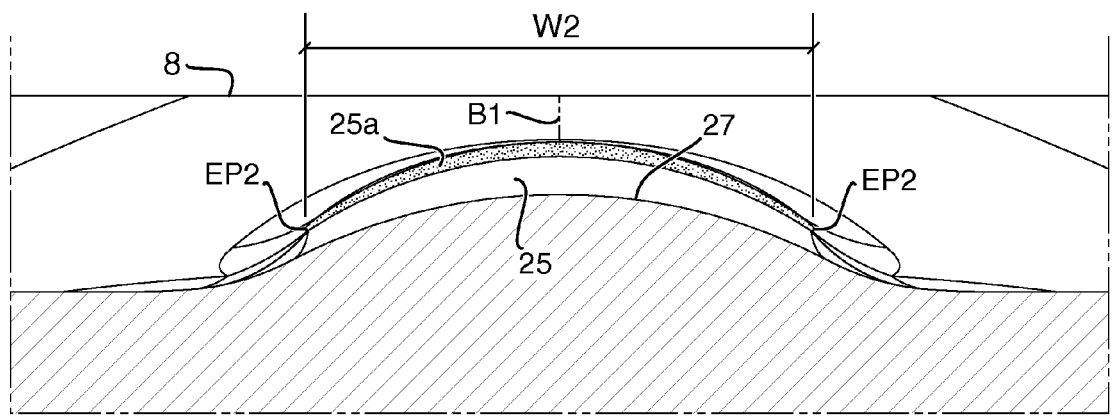
FIG. 16 is an analogous cross-section taken along line XVI-XVI of FIG. 13.

In FIG. 16 (see the section XVI-XVI in FIG. 13), there is shown, on one hand, how the upper part 25a of the second breast surface 25 is situated on a considerably higher level than the lowest level of the valley 27 along the bisector B1, and, on the other hand, how the width W2 of the second breast surface 25 is considerably smaller than the width W1 of the first breast surface. In the example, W1 amounts to 1.0 mm, and W2 to 0.6 mm. The width W2 may vary upward as well as downward from the last-mentioned value. However, W2 should preferably amount to at least 50% of W1.

Figure 17:
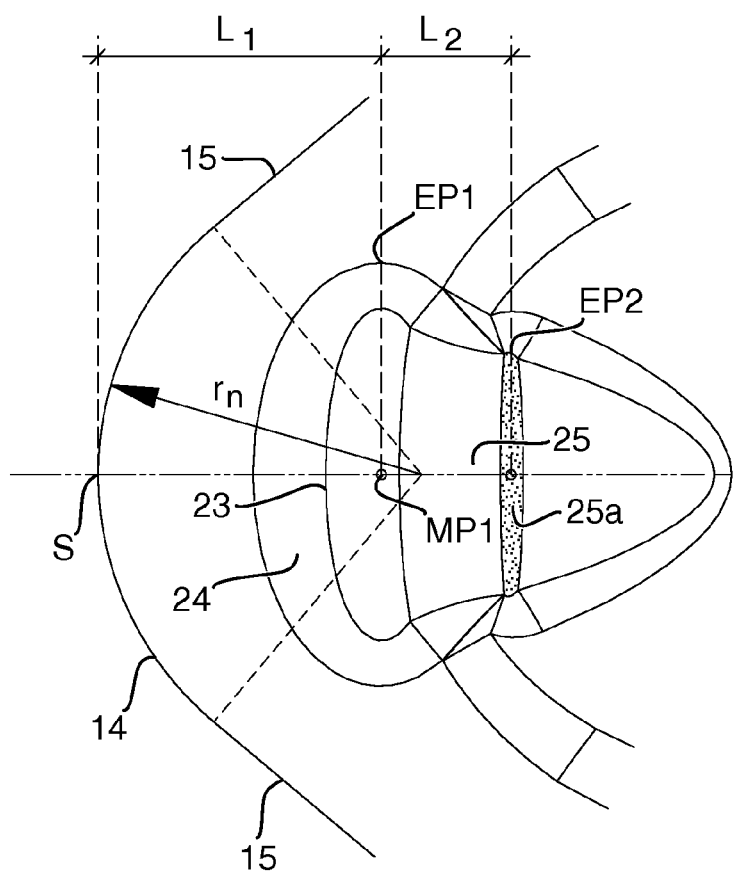
FIG. 17 is a detailed planar view illustrating the location of the two breast surfaces in relation to the nose edge of the primary cutting edge.

In FIG. 17, the two breast surfaces 24, 25 are illustrated in relation to the nose edge 15. In the example, the corner radius $r_n$ amounts to 0.8 mm, a sector inside the nose edge 14 having an arc angle of 100° (180°–80°). As clearly seen in FIG. 17, the radial distance between the cutting tip S and the center MP1 is smaller than the radius $r_n$. In the example, L1 accordingly amounts to approx. 0.7 mm. In other words, the first breast surface 24 is situated near the nose edge 15 in order to be quickly hit by a narrow chip of the type that primarily is removed only along the nose edge 15. Furthermore, the second breast surface 25 is in turn situated near the front breast surface 24 so far that the distance L2 is smaller than L1. In the example, L2 amounts to 0.3 mm, i.e., less than half the measure L1. In this connection, it should also be pointed out that the second breast surface 25 (see FIG. 6) is situated at a significant distance in front of the front part of the flat support surface 8. Thus, the last-mentioned distance is somewhat greater than the distance (L1+L2) between the cutting tip S and the second breast surface 25. Chips that obtain guiding by either the first breast surface 24 or, at all events, the breast surface 25 being behind, will therefore be guided sideward in good time before they reach up to the support surface 8. In other words, the chips are guided sideward without being able to damage the support surface 8, if this will be utilized not until after inversion of the turning insert.

Figure 18:
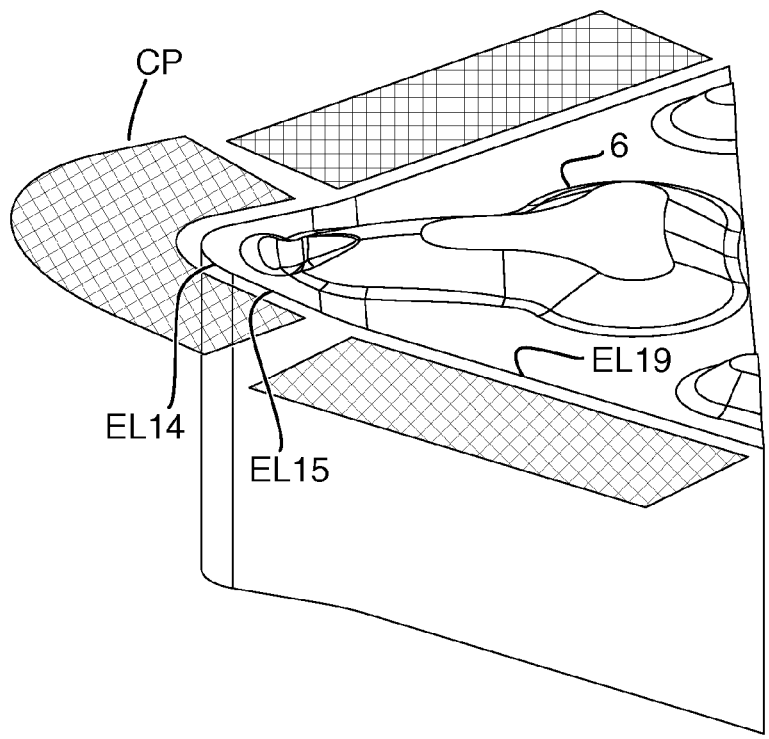
FIG. 18 is a partial top view showing how the primary cutting edge is angled in relation to the neutral plane of the turning insert.
Figure 19:
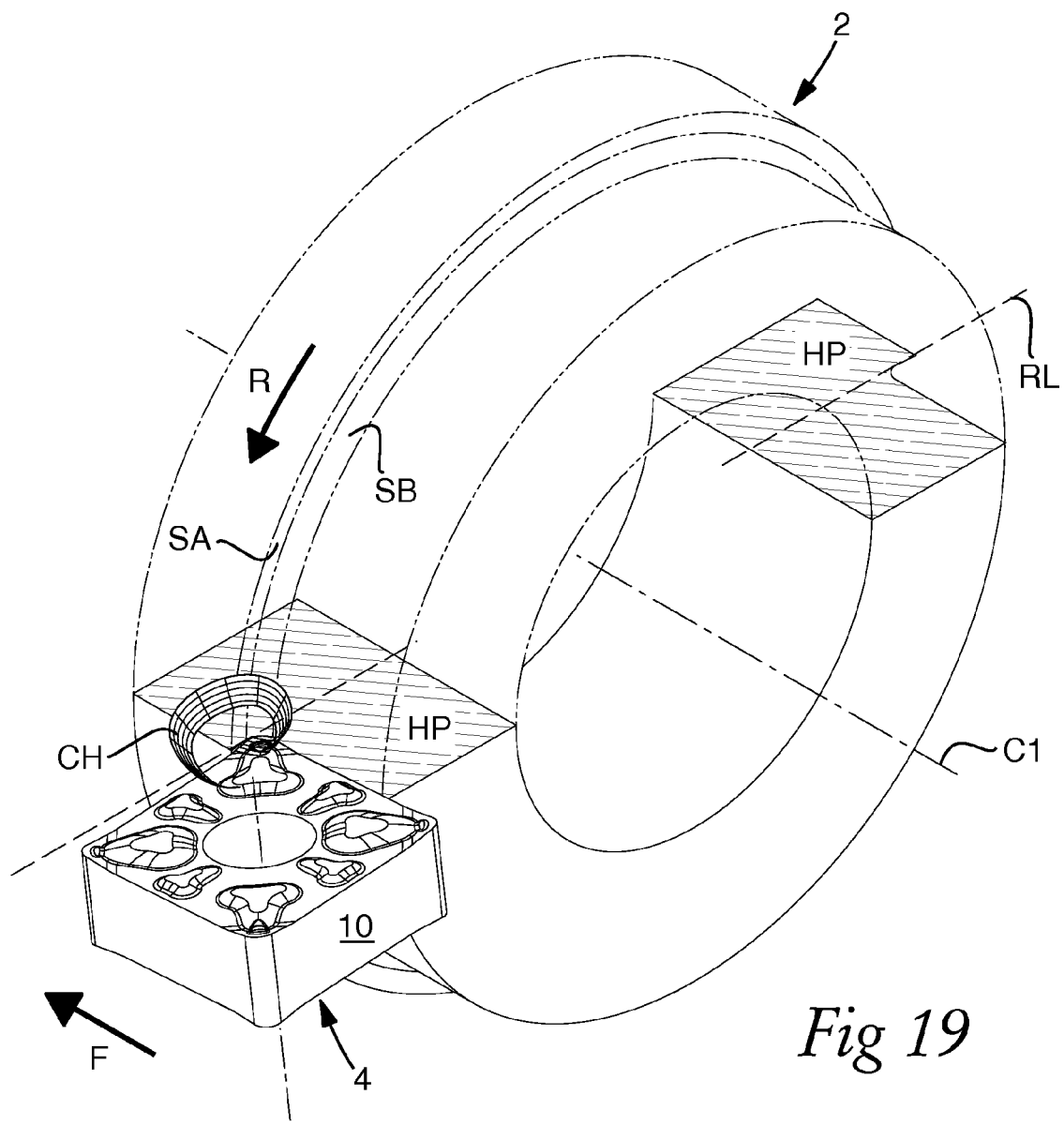
FIG. 19 is a partial cross-sectional perspective view showing a tubular workpiece as well as a turning insert according to the disclosure during machining of the same.
Figure 20:
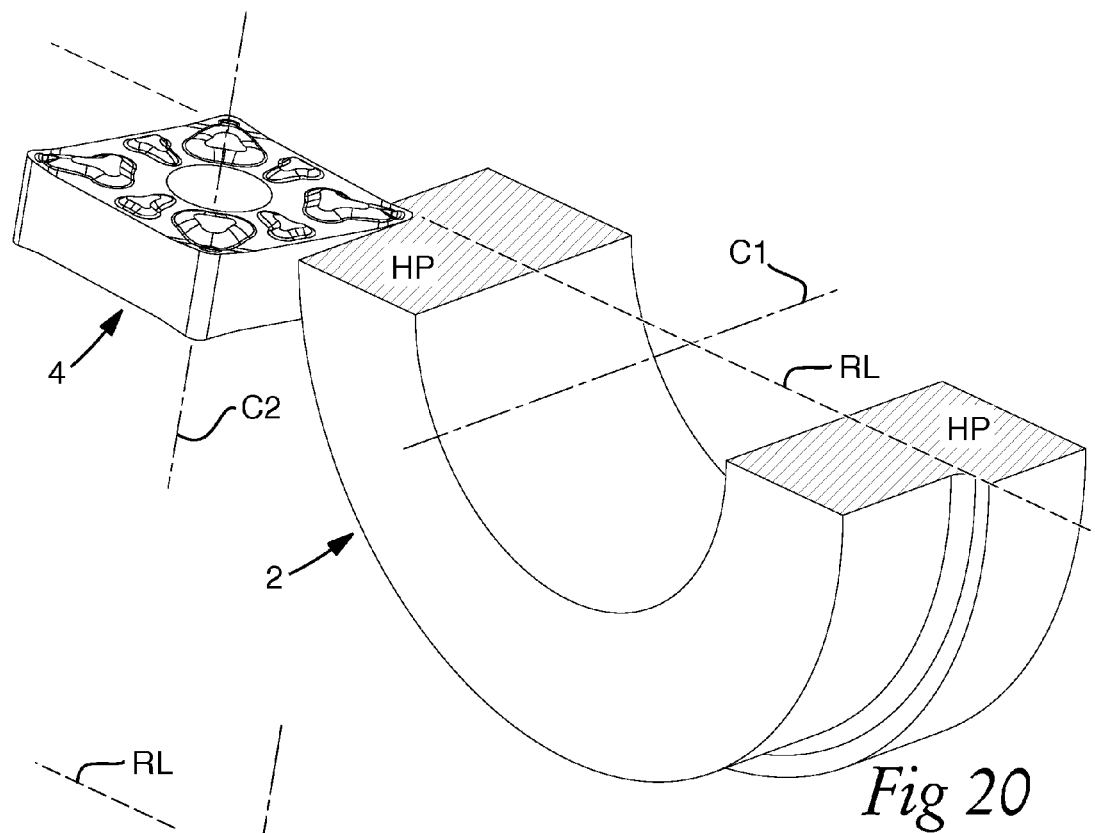
FIG. 20 is a similar perspective view from another sighting point showing the engagement of the turning insert in the workpiece during turning.
Figure 21:
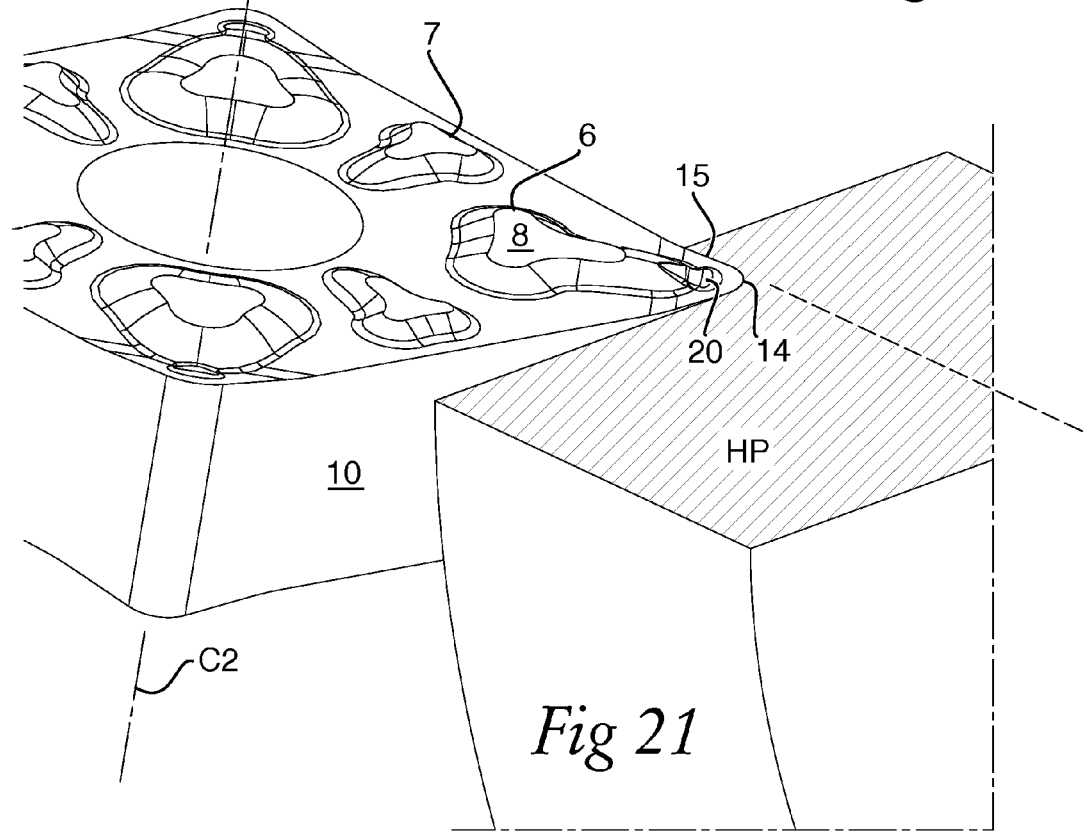
FIG. 21 is a further enlarged perspective view showing the same engagement as in FIG. 20.

In FIGS. 6-12, it is seen that the wedge angle of the cutting edge $\alpha_1$ in the section VII amounts to 81.5° (the complementary angle of which amounts to 8.5°). In the example, the chip part surface 16a is in the form of a flat surface (could also be slightly arched). This means that the angle of inclination of the corner plane CP (see also FIG. 18) in relation to the reference plane RP (as well as the neutral plane NP) amounts to 8.5°. From cross-section VII-VII, the wedge angle of the cutting edge $\alpha_1$ increases toward the cross-section VIII-VIII, more precisely to a value $\alpha_2$ of 84.5°. This angle is constant along the entire main edge 15 (see FIGS. 8 and 9). Along the intermediate edge 18, which is situated along the arched chip part surface 16b, the wedge angle of the cutting edge $\alpha_3$ increases successively from 84.5° to 90° in the segment where the intermediate edge 18 transforms into the auxiliary cutting edge 19 (see FIG. 11). In the example, the wedge angle of the cutting edge $\alpha_4$ is constantly 90° along the entire auxiliary cutting edge 19, involving that the same, per se, has a negative cutting geometry, but thereby also a considerably greater strength than the cutting edges 14, 15, 18.

Figure 1:
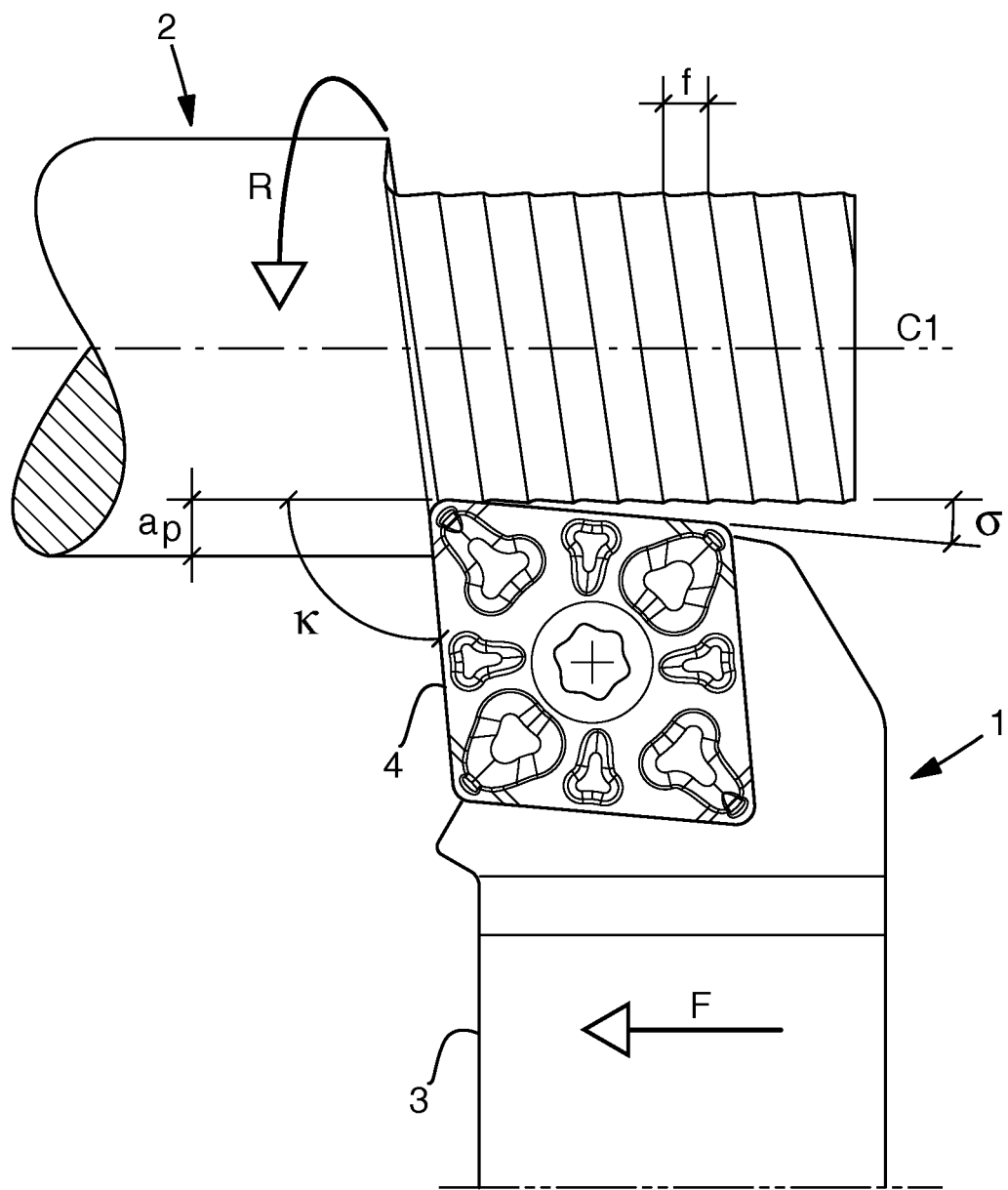
FIG. 1 is a schematic illustration of a general course of turning.

To explain the function of the turning insert according to the disclosure, reference is made to FIGS. 19-25, FIG. 19 of which illustrates a workpiece 2, which is rotated on a center axis C1, which is contained in a horizontal plane indicated by HP. The machining of the workpiece is carried out by means of the turning insert 4, which during its longitudinal feed in the direction of the arrow F produces a chip designated CH. During the turning, the turning insert 4 is (via the appurtenant holder 3 according to FIG. 1) tipped-in in a spatial position in which the two straight main edges 15 of the primary cutting edge 12. More precisely, the cutting edge lines EL15 thereof are located in the horizontal plane HP, the nose edge 14 as well as the active main edge 15 affording a positive cutting geometry. Simultaneously, the clearance surface 9 (which is perpendicular to NP, but angled in relation to the chip part surface 16b) of the turning insert, will clear from the ring-shaped surfaces SA (flat) and SB (concave) that are subjected to machining. If $\alpha_1$ in the section VII-VII (see FIG. 12) amounts to 81.5°, the clearance angle A (see FIG. 25) between the concave surface SB and the clearance part surface 11 of the turning insert at the nose will amount to 90–81.5=8,5°. A corresponding clearance (not shown) is obtained also in relation to the flat surface SA, more precisely at a clearance angle that is a complementary angle to the wedge angle of the cutting edge in cross-section IX-IX (FIG. 9), i.e., in the example 90–84.5=5.5°.

Figure 22:
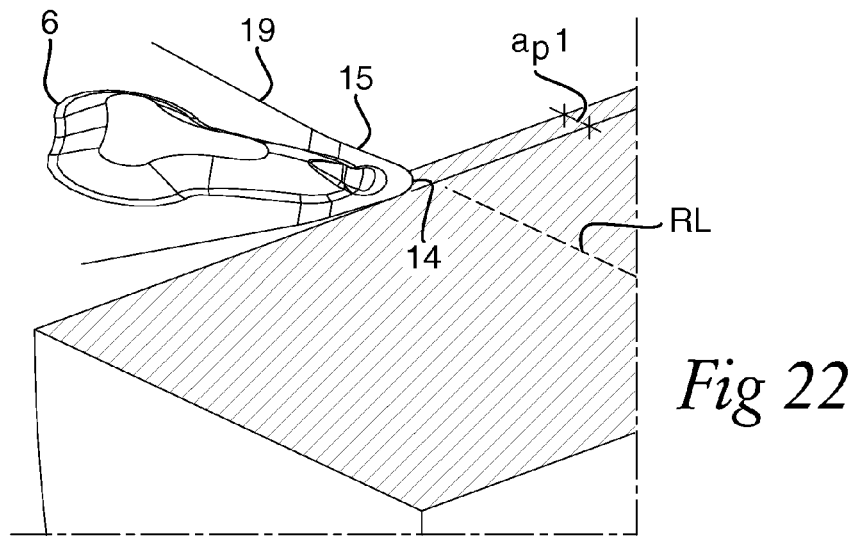
FIGS. 22-24 are cut perspective views showing the turning insert during turning at different cutting depths.
Figure 23:
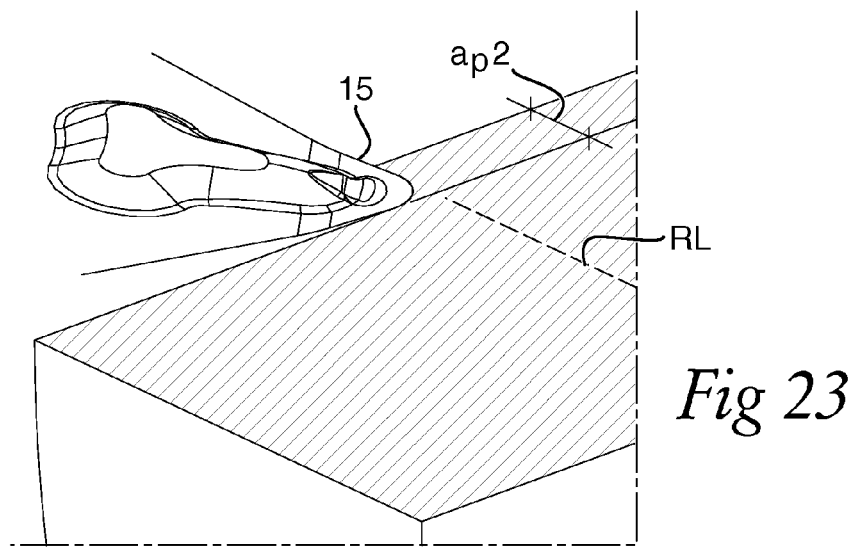
Figure 24:
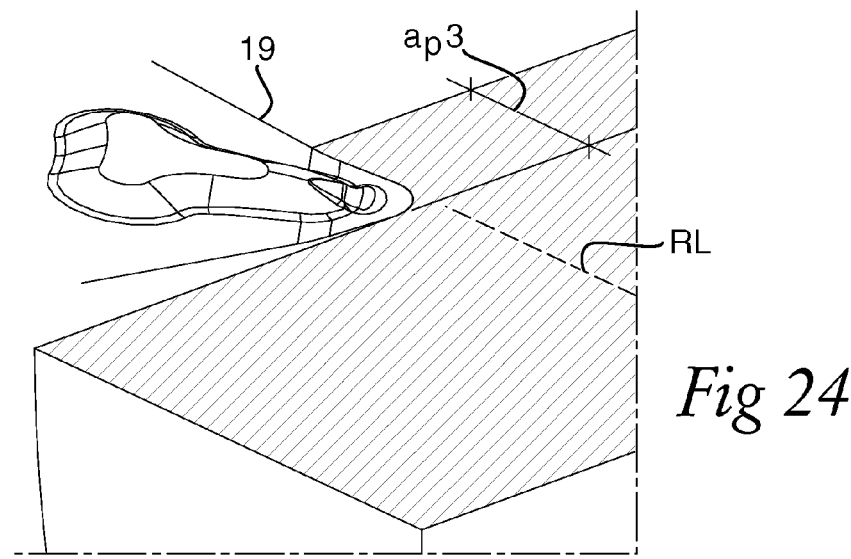
Figure 25:
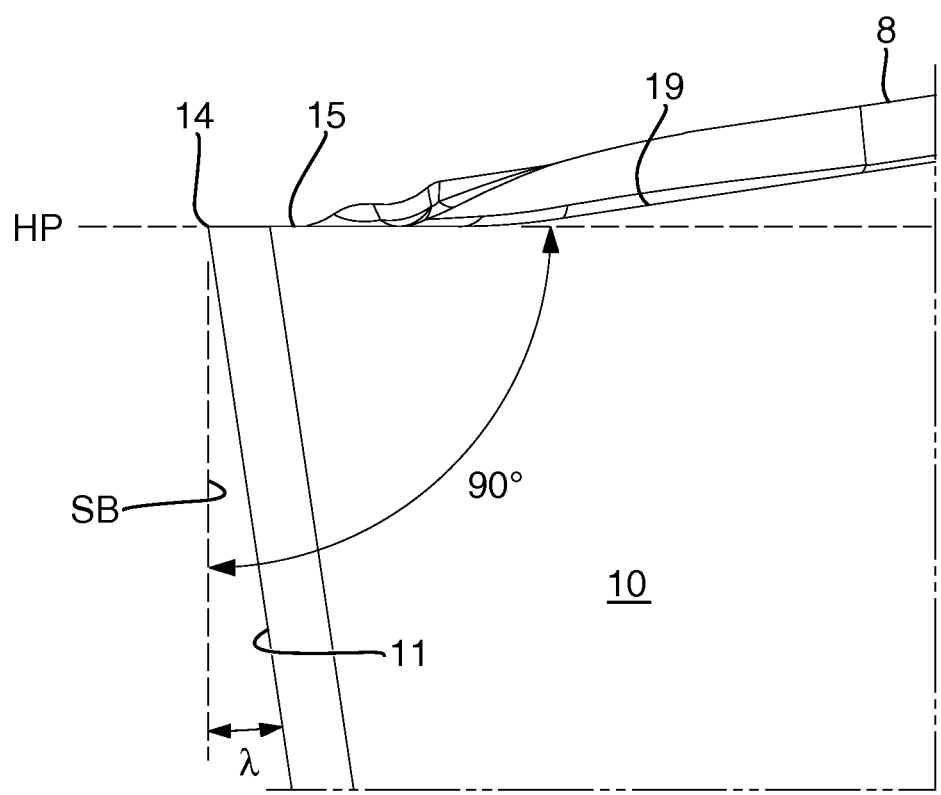
FIG. 25 is an enlarged detailed view showing the clearance of the turning insert in a corner.

In FIGS. 22-24, it is shown how the turning is carried out at different cutting depths $a_p$. In FIG. 22, the cutting depth $a_p1$ is minimal, e.g., in the order of 0.5-0.8 mm. In this connection, the chip removal is essentially made only along the nose edge 14 (which in the example has a radius of 0.8 mm). Because of the principle that infinitesimal parts of the chip are directed perpendicular to the cutting edge, the chip will in this case become cross-sectionally arched and obtain a chip flow direction at a very moderate angle to the bisector B1. After the moment of removal, the chip follows the chip part surface 16a so as to after a short time (cf. the distance L1) impinge on the front breast surface 24 of the knob 20. If the chip peradventure would not be subjected to desired guiding by means of said breast surface 24, the same will run further rearward so as to then impinge on the rear breast surface 25 situated higher, which with greater reliability guides away the chip sideward (in the way indicated in FIG. 19). In such a way, the chip will be broken into pieces or fragmented by, for instance, diving in against the chip surface by the side of or behind the land 6 or against the connecting clearance surface 9 of the turning insert.

In the examples according to FIGS. 22 and 23, the cutting depths $a_p2$ and $a_p3$ are greater. This means on one hand that a major part of the chip will be removed along the straight main edge 15, and to a varying extent also the cutting edges 18 and 19, and on the other hand that the chip flow direction is changed and forms an increasing angle to the bisector B1 as the cutting depth increases. In addition, the chip becomes flat or rectangular in the major part of its cross-section, however with the exception of a slender (frayed) edge portion having a bent shape produced by the nose edge 14. This means that a greater part of the chip with the increasing cutting depth will impinge on and be guided by the flank surface 21. If not only the cutting depth but also the feed has been increased, the stiffness of the chip has now become considerably greater than in the first example (cf. reed/blade of grass). In spite of the increased stiffness, however, the chip will be guided in a careful, although distinct way, above all as a consequence of the perpendicular distance from the cutting edge line up to the flank surface 21 increasing with increasing cutting depth, but also as a consequence of the flank surface 21 as well as the side surfaces of the knob 20 and cam 30 being relatively flat, i.e., rising at moderate pitch angles. The knob 20 is the highest at the point TP and declines successively toward the end points EP. For this reason, these surfaces do not afford any abrupt obstacles against which the thicker chip could be over broken. In this connection, it should particularly be emphasized that neither do the cam 30 and the second breast surface 25 included in the same contribute to any risk of over breaking, in spite of the second breast surface 25 projecting higher (0.051 mm) than the first breast surface 24, more precisely as a consequence of the cam being situated at a greater lateral distance from the straight cutting edge line along the flat clearance part surface 10, and the flank surfaces thereof sloping flatly downward from the highest crest of the cam. In addition, the second breast surface 25 has a limited width W2. Moreover, of significance is the fact that the flank surfaces 21 have a height of at most 0.400 mm, suitably 0.300 mm, as in the example according to FIG. 12.

An advantage of the disclosure is that the primary cutting edge (nose edge+main edge) becomes easy-cutting as a consequence of its positive cutting geometry. In addition, the chip-guiding capacity of the turning insert becomes good and reliable during all the varying conditions that may occur during practical turning, such as varying cutting depths, varying feed, and machining of different materials (the inherent properties of which may give the chip a most varying character, e.g., in respect of the radii of curvature). In particular, the chip removal as well as the chip formation at small cutting depths becomes essentially improved, without the chip formation at large cutting depths being detrimentally affected.

In all drawing figures, the present, cutting edges have been shown sharp-edged so far that the chip surface and the clearance surface converge in a thin line, viz. the cutting edge line. In practice, said cutting edge line may be made stronger, e.g., by brushing or by means of an utmost narrow, strengthening chamfer surface (maximum width 0.05 mm).

The description is not limited only to the embodiment described above and shown in the drawings. Thus, the chip-directing guide surfaces of the chip-forming means may be modified in various ways. For instance, the front knob, which includes the breast surface intended foremost for thin chips, may be separated from the part of the land being behind that includes the flank surfaces that have the purpose of guiding wider and stiffer chips. It is also feasible to form said flank surfaces on other, projecting members than such lands that simultaneously include a support surface. Furthermore, it is possible to apply the invention to turning inserts having another basic shape than tetragonal, e.g., triangular. It should also be mentioned that the auxiliary cutting edge of the turning insert, which is situated on a moderate level below the plane in which the support surfaces are located, also may be slightly cambered instead of absolutely straight. It is also feasible to form the auxiliary cutting edge with a moderate, positive cutting geometry, e.g., having the shape of a wedge angle of the cutting edge within the range of 87-90°.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

The invention claimed is:

1. A double-sided, indexable turning insert having a polygonal basic shape, comprising:
    a plurality of corners;
    a peripheral clearance surface;
    identical upper and under sides, in which there are included flat support surfaces situated in reference planes, which are parallel to each other and to a neutral plane, situated halfway between the reference planes and toward which the clearance surface extends at a right angle; and
    a plurality of primary cutting edges formed along the upper side as well as the under side, each primary cutting edge including a nose edge situated in a corner and two main edges, which converge toward the same and deviate in relation to a bisector, wherein the nose edge is formed between a front chip part surface and a convex part of the clearance surface and having an arched cutting edge line, the main cutting edges being formed between lateral chip part surfaces and flat parts of the clearance surface and having straight cutting edge lines, at least the main edges having the cutting edge lines thereof situated in a common corner plane, which is inclined in relation to the neutral plane in a direction of a respective reference plane, and transforming into auxiliary cutting edges, which run parallel to the neutral plane and separate pairs of primary cutting edges placed in corners, besides which chip-controlling guide surfaces are situated inside said chip part surfaces, wherein each individual primary cutting edge has a generally positive cutting geometry such that not only a wedge angle of the cutting edge between the chip and clearance part surfaces of the individual main edge, but also the wedge angle of the cutting edge between the chip and clearance part surfaces of the nose edge is acute in arbitrary sections along the respective cutting edge lines, wherein each of said guide surfaces includes a breast surface included in a knob, which is situated behind the nose edge along the bisector between the main edges, and a pair of flank surfaces included in a land situated behind the knob and in which also the support surface is included, the breast surface being convexly arched and having a length extension that runs transversely to the bisector, and the breast surface sloping at an angle, which decreases from a greatest value along the bisector toward a smallest value in a second section perpendicular to the bisector.

2. The turning insert according to claim 1, wherein not only the cutting edge lines of the main edges, but also the cutting edge line of the nose edge are collectively situated in said corner plane.

3. The turning insert according to claim 1, wherein the wedge angle of the cutting edge of the primary cutting edge increases from a smallest value in a first section along the bisector between the main edges, toward a greatest value closer to a respective auxiliary cutting edge.

4. The turning insert according to claim 1, wherein each individual main edge transforms into a auxiliary cutting edge via an arched transition edge, wherein the wedge angle of the cutting edge of the transition edge successively increases in the direction from the main edge toward the auxiliary cutting edge.

5. The turning insert according to claim 1, wherein the level difference between the support surface and a reference plane common to the auxiliary cutting edges amounts to at most 0.400 mm.

6. The turning insert according to claim 1, wherein the chip-directing guide surfaces are inclined at a pitch angle, which amounts to at most 30° in relation to the neutral plane.

7. The turning insert according to claim 1, wherein at a distance behind the knob, there is formed a second breast surface, an upper part of which is situated on a higher level than an upper part of the first breast surface, and which has a width that is smaller than a width of the first breast surface although amounting to at least 50% of the same.

8. The turning insert according to claim 1, wherein the corner plane has an angle of inclination in relation to the neutral plane that is 6°-11°.

9. The turning insert according to claim 8, wherein the angle of inclination of the corner plane in relation to the neutral plane is 8.5°.

10. The turning insert according to claim 1, wherein each primary cutting edge and the corner plane have an extension that maximally amounts to a cutting depth of 2-5 times a radius of the nose edge.

11. The turning insert according to claim 10, wherein the extension of each primary cutting edge and corner plane amounts to a cutting depth of approx. 3.75 times the radius of the nose edge.

12. The turning insert according to claim 1, wherein a distance in a direction perpendicular from the cutting edge line up to the chip-controlling guide surface increases with the cutting depth when this exceeds the extension of the respective primary cutting edge and corner plane.

* * * * *